Figure 1:
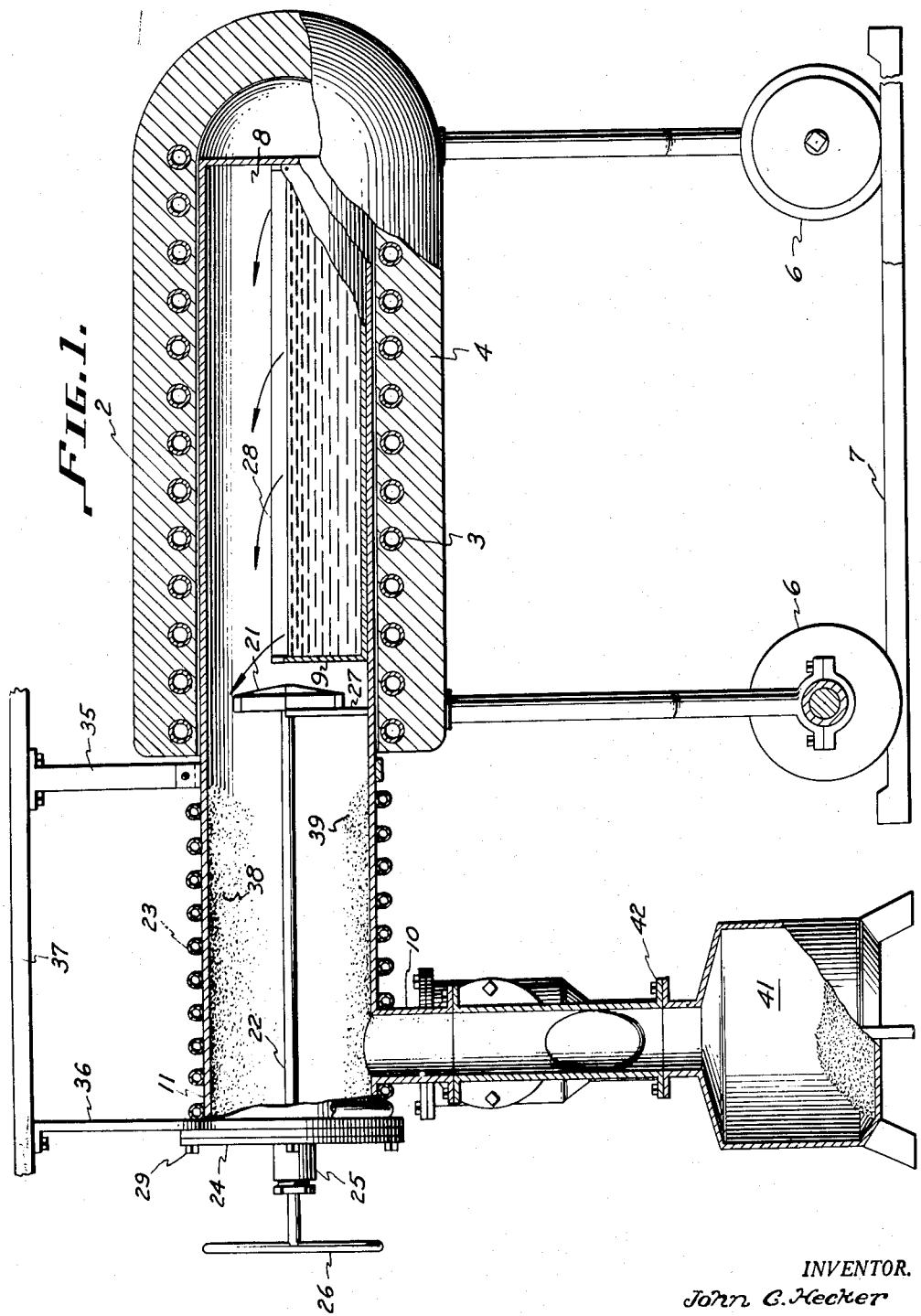

April 24, 1956  J. C. HECKER  2,743,169
HORIZONTAL SUBLIMATION APPARATUS
Filed Sept. 2, 1944  2 Sheets-Sheet 1

INVENTOR.
John C. Hecker
BY
Robert A. Lavender

April 24, 1956 J. C. HECKER 2,743,169
HORIZONTAL SUBLIMATION APPARATUS
Filed Sept. 2, 1944

INVENTOR.
John C. Hecker
BY

United States Patent Office 2,743,169
Patented Apr. 24, 1956

2,743,169

HORIZONTAL SUBLIMATION APPARATUS

John C. Hecker, Oak Ridge, Tenn., assignor, by mesne assignments, to the United States of America as represented by the United States Atomic Energy Commission Application September 2, 1944, Serial No. 552,557

4 Claims. (Cl. 23—264)

This invention relates to a sublimation process and apparatus. More particularly, this invention concerns a process and apparatus especially adapted for the treating of uranium compounds such as the halogen derivatives thereof to obtain purification, the production of a hygroscopic material and other improvements in the compounds, and relates to the co-pending application of Krohn, Serial No. 553,446.

In general, the use of sublimation processes in the industry is old and well known and a number of processes and kinds of apparatus have been proposed in the prior art. For example, the treatment of metallic materials such as magnesium, aluminum chloride, and the like has been carried out by a procedure wherein these materials are subjected to sublimation for the separation or purification thereof. The apparatus has comprised tubes or retorts surrounded by a furnace or other heating device for volatilizing the materials being sublimed. The aforementioned elements are connected with condensing devices for collecting the sublimed materials.

More elaborate processes and apparatus have been developed particularly as respects the processing of magnesium materials. In such constructions the condensing units have been provided with baffles, removable liners, and other refinements. The sublimation apparatus has in many instances been of a vertical type requiring the use of an overhead crane or comparable device for the opening thereof during charging or for other purposes.

Some of the devices and processes of the prior art have not been suitable for subliming hygroscopic materials, or susceptible to speedy operation or efficient large scale continuous operation. Also, many of the devices are not suitable for the processing of uranium materials because of the hygroscopic nature of the sublimate.

Certain vertical sublimation equipment and processes of operation have been proposed by others working closely in the field of the present invention. However, the present construction is believed to constitute an improvement over these last-mentioned units and processes in convenience and speed of operation, greater adaptability to large scale production and capability of forming a high grade hygroscopic product particularly suitable for use in certain processes wherein there is a demand for a high quality uranium halide of the type producible by this process and apparatus.

I have discovered an improved sublimation apparatus and process which is particularly suited for the sublimation treatment of uranium materials, exemplified by the production of a purified high grade crystalline uranium chloride.

This invention has for a general object to provide an improved sublimation process and apparatus.

Another object is to provide a sublimation apparatus that has improved characteristics from the standpoint of ease of operation, speed of operation, and freedom from maintenance requirements.

Another object is to provide a sublimation apparatus operating under reduced pressure from which sublimate may be removed without substantial interference with the reduced pressure conditions or subjection of the sublimate to contact with moisture.

Another object is to provide apparatus that is adapted to operate under various degrees of reduced pressure together with an arrangement of elements for obtaining the aforementioned reduced pressure.

Still another object is to provide an apparatus of the aforementioned type wherein the resultant sublimed materials may be obtained in the form of hygroscopic crystals and be maintained under relatively dry conditions.

Still another object is to provide a sublimation process for application to uranium materials particularly halogen derivatives of uranium.

Still another object is to provide a process that not only includes sublimation and condensation of product but which provides for the removing of the product to containers under protected conditions.

Other objects will appear hereinafter.

I have found that a particularly suitable apparatus of the class described may comprise a horizontally positioned elongated heating container or boat for holding the charge to be sublimed, connected in a particular manner with a condensing chamber, the chamber being provided with an externally operable means disposed within the condenser for scraping material condensed therein into a sublimate container and other novel features as will be described in detail hereinafter.

For further understanding of my invention, reference is made to the attached drawings forming a part of the present application.

In the drawings, Fig. 1 is a semi-diagrammatic side-elevation view of the complete sublimation apparatus assembly in which certain parts are broken away and other parts shown in section for clarity.

Figure 2:
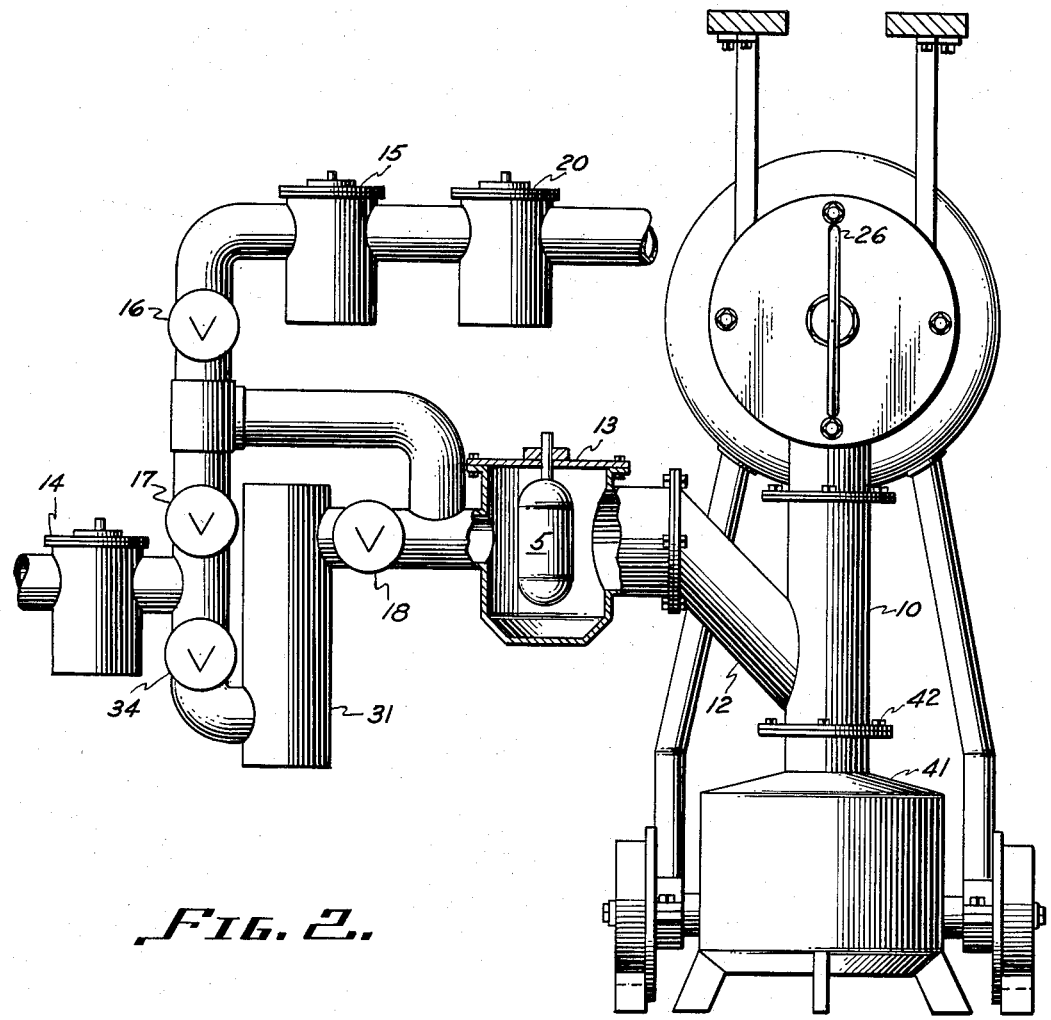

Fig. 2 is an end view of the sublimation apparatus in which certain elements are shown in section, and portions of the reduced pressure system are included.

Referring now to Fig. 1, reference numeral 2 represents a movable electric furnace for encompassing member 8. The furnace may be moved onto and off of the vaporizing or heating chamber 8. This furnace may be of conventional construction including suitable heating elements indicated at 3, insulation at 4, and various other usual parts for the construction and operation of electric furnaces. Wheels 6, which move on track 7, may be provided for permitting the movement of the furnace into and out of position as already referred to. The furnace may be moved out of position for cooling, repair, and other similar purposes.

Member 8 houses the charge boat 9, and certain other parts, such as means 21 for scraping off condensate. Member 8 is connected to or by extension thereof provides a condenser structure 11 of elongated configuration.

The condenser 11, by means of conduits 10 and 12 (see Fig. 2) is connected to one or more mechanical vacuum pumps (not shown), the traps 13, 14, 15 and 20, gauges and the like employed in an efficient vacuum system. While the particular vacuum system employed is not a limitation on the present invention, one arrangement comprising several different types of vacuum apparatus, which has been found to give good results is described herein. The vacuum system preferably includes various control devices (not shown) such as Pirani gauges, ionization gauges and the like.

Referring to Fig. 2, the particular vacuum system employed in the present embodiment comprises three sources of reduced pressure. That is, the sublimation system may be interconnected through valve 17 and trap 14 to a mechanical pump as a Kinney pump (not shown).

Or the system may be connected through the valve 16 and traps 15 and 20 to a roughing pump (not shown). For very low reduced pressure, the system may be connected, by means of valves 18 and 34, to a diffusion pump diagrammatically illustrated at 31. The functioning of those various parts will be apparent from description set forth hereinafter. However, briefly, the operation is as follows: Traps 13 and 14 are filled, that is the internal bulb 5 is filled (see trap 13) with a cooling medium, such as liquid nitrogen, liquid air, Dry Ice or the like. Valve 17 is open and the other valves are closed thereby throwing the pressure reduction onto the mechanical pump. After a preliminary heating to be described more fully hereinafter, valve 17 is closed and valve 16 opened, traps 15 and 20 having been filled. The system is then on the roughing pump. During this period trap 13 may be degassed and trap 14 removed and cleaned and replaced. After this cycle traps 13 and 14 are refilled, valve 16 closed, valve 17 opened throwing the system back on the mechanical pump. Thereafter by closing valve 17 and opening valves 18 and 34, the diffusion pump may be cut into the system.

Referring again to Fig. 1, the condenser includes the condensate removing means 21 adapted to be operated from the outside by means of rod 22. This rod extends through the closure or head 24 bolted onto the condenser by bolts 29. A suitable gland such as a Wilson type seal or similar known construction is provided at 25 so that the rod 22 may extend to the outside handle member 26, which may be turned, without breaking the vacuum. That is, a construction is provided so that handle 26 may be rotated and pulled or pushed thereby moving rod 22 in a corresponding manner without air leakage into the apparatus along rod 22. The condenser 11 and associated or connected parts such as vaporizing chamber 8 may be supported at the desired height in any suitable manner. For example the parts may be supported by heavy strap iron or rods 35 and 36 attached to some overhead means such as a support 37. As indicated in the drawing, member 8 is supported in such a manner that the furnace 8 may be conveniently rolled into encompassing relationship for heating the vaporizing chamber 8.

The condenser 11 is connected, by means of conduit 10, to a receiver or container 41 into which sublimate may be scraped. This receiver may be in the form of a device which is used in other processes and is bolted onto conduit 10 in a vacuum tight manner by bolts 42.

As indicated at 23, the outside of the condenser is provided with a number of temperature controlling coils of standard design which may be connected to water lines or the like in a conventional manner.

Within condenser 11 and attached to parts 21 and 22 is the moon shaped hoe member 27. This member functions to scrape out condensate as will be described. Other scraping devices may be employed for accomplishing this purpose, the aforementioned construction merely being illustrative.

The boat 9 previously referred to is in effect an elongated cylindrical alloy tank or tray, for example, of semi-circular cross-section. That is, the top of tank 9 is open at 28 to permit the evolution of vapors.

Referring now to the various incidental parts, the traps 13, 14, 15, and 20 are conventional liquid air or liquid nitrogen traps. They are adapted to contain a bulb 5 as shown in trap 13, into which may be introduced the liquid freezing medium which causes the condensation of condensables as they pass out of the apparatus through the conduit 12.

The vaporizing chamber 8 and the condenser 11 as well as the boat and various other parts are preferably constructed from corrosion and heat resistant non-ferrous alloys or alloy steels as for example from the well known stainless steel compositions. The alloy steels would preferably include in addition to chromium and nickel contents, contents of other alloying elements such as molybdenum, columbium, tungsten, titanium, or the like.

The boat may advantageously be constructed from a high nickel-chromium heat and corrosion resistant alloy exemplified by the commercially obtainable material "Hastelloy." The various parts between the condenser and the sources of reduced pressure, as for example commencing with conduits 10 and 12, may be constructed from ordinary steel or other standard materials usual for the construction of the particular part.

The functioning of the apparatus will be described by considering that the apparatus is cold, namely either that the furnace is turned off or moved off from vaporizing chamber 8. Also, it will be considered that the condenser head 24 has been removed and that the hoe member 27 and other parts within the apparatus have been taken out.

The boat 9 is filled with a charge (100–225 lbs.) of, for example, a uranium chloride such as uranium tetrachloride which it is desired to process in accordance with the present invention. The boat is slid into the vaporizing chamber 8 to the back thereof. The closure 24 is secured in place by bolts 29. This carries with it the rod 22, scraper or hoe member 27 and associated parts.

The traps 13 and 14 are then filled with cooling medium such as liquid nitrogen. The mechanical vacuum pump is connected into the system by opening the valve 17 slowly, then fully, and the system is pumped down very slowly to about one-tenth millimeter of mercury pressure. It is desirable that the rate of reducing the pressure at the start of the process be slow in order to prevent solid particles from being carried over into the vacuum system mechanically. After the preliminary reduction in pressure, the pump may be permitted to run at full rate for at least 15 minutes to degas the charge. That is, air and entrapped volatiles removable by reduced pressure are pumped out to some extent. The subsequent heating facilitates further degassing.

The heater 2 is then rolled into place encompassing the vaporizing chamber 8, and the current is turned on slowly raising the furnace temperature to approximately 350° C. The temperature range, namely, the furnace temperature is between approximately 250° C. and 450° C., and a period of about two hours would be employed for conducting the initial heating. During approximately the next two hours of heating, the temperature of the furnace is permitted to rise to between 550° C. and 650° C.

During this later heating period, valve 17 is closed and valve 16 on the roughing line is opened. In order to clean the system of materials stopped by trap 13 the liquid air is removed from trap 13 and steam introduced into trap 13 so that condensate such as HCl, COCl₂ and the like, is volatilized out through the roughing line, and recondensed in liquid air traps 15 and 20 if desired. The liquid air traps are again filled with either liquid nitrogen or liquid air and the system again connected onto the mechanical pump by closing valve 16 and opening valve 17. The reduction in pressure is continued until it is sufficiently low to permit cutting in the diffusion pump 31 by opening valves 18 and 34.

The temperature of the furnace is now within the range of approximately 700° C. to 825° C., and the ultimate degree of reduced pressure at the top of the diffusion pump would be of the order of $2 \times 10^{-5}$ millimeters of mercury. It is not entirely essential that the system be placed under this high degree of reduced pressure as sublimation of the uranium halides may be carried out under reduced pressure of the order of 30 or 40 millimeters of mercury. It is desirable, however, that a sufficient degree of reduced pressure be maintained as respects the particular material being processed so that the system does not at any time pass through the liquid phase. In other words, the uranium tetrachloride should sublime directly and completely from the solid to the vapor. If liquid uranium chloride forms in the system, because of its corrosive action, the various metal parts may be corroded and injured. The magnitude of the temperature is not particularly critical, it merely being desirable to maintain adequate temperature for causing the materials to sublime. The temperature of the particular uranium chloride being described may be raised to not more than about 586° C., namely the melting point of UCl₄.

With the process functioning under the aforementioned temperature and pressure conditions, the vapors speedily pass out of the boat 9 into the interior of condenser 11. The uranium halide vapors become condensed on the inner walls of the condenser, as at 38 and 39, in the form of a satisfactory hygroscopic product. The condensation is controlled by circulating cooling fluid in coils 23 to take up the heat of condensation. Preferably the condenser is not cooled too drastically to cause the formation of an amorphous product. That is, the condenser inner surface is preferably maintained at between about 200° C. and about 350° C., in the processing of uranium tetrachloride, to obtain a crystalline product. That is, sufficient cooling is applied to prevent carryover of vaporized product into the vacuum system. On the other hand drastic cooling that may cause the formation of poor crystalline structure would preferably not be applied.

After the process has continued for a sufficient period so that substantially all of the material in boat 9 has been sublimed, the furnace 2 may be rolled off and the apparatus permitted to cool. The apparatus is preferably slowly air cooled for about three-quarters of an hour prior to the application of any severe external cooling. After the equipment has cooled down sufficiently, the sublimed product on the condenser walls, indicated by reference numerals 38 and 39, is scraped off, without breaking the vacuum, by rotating and pulling handle 26. This in turn, through rod 22, rotates and moves parts 21 and 27. In this way the sublimate may be scraped off the condenser walls and moved so that it falls through conduit 10 into container 41 where it is largely protected from the influx of moist air when closure 24 is open and the apparatus is being recharged. If desired a slight degree of reduced pressure may be maintained on container 41 through conduit 12 when closure 24 is open for protecting the hygroscopic sublimate collected in 41. However, this is usually unnecessary in view of the protected position of container 41. When sufficient sublimate has been collected in 41, it may be unbolted at 42, capped, removed and another container attached.

Thereafter the apparatus may be cleaned as by washing, dried and another boat filled with material to be sublimed inserted, and the process repeated on another batch of crude material. The apparatus is advantageous in that, from the practical standpoint, it provides equipment at a convenient working height. The purified product may be scraped out while under reduced pressure conditions and kept dry.

The product obtained in the above examples was in the form of homogeneous crystals which were removed from the inner surface of the condenser and scraped through conduit 10 into containers. The process has been described as applied to the treatment of uranium materials as the process has been found to give particularly satisfactory results in converting commercially produced uranium material to a refined, high grade product. While my invention is particularly adapted to the treatment of uranium materials, it may, in general, be applied to the treatment of various other materials susceptible of sublimation. For illustration there may be mentioned aluminum chlorides, iron chlorides, and certain organic compounds. When processing some of these other materials it may be desirable that the condensation be at a temperature below 100° C.

As indicated, certain of the temperatures referred to herein are described as furnace temperatures. The temperature of the charge materials lags below the furnace temperature. That is, the temperature of the charge gradually rises from its temperature, as for example room temperature, as charged approaching the furnace temperature or reaching its volatilization temperature at which temperature the charge remains until volatilized.

The degree of reduced pressure employed is generally below 50 millimeters of mercury. The particular lower limit of reduced pressure is determined to some extent by the efficiency of the reduced pressure system. By means of the diffusion pumps and other parts described reduced pressures of the order of $2 \times 10^{-5}$ are obtainable. With other pumps still lower pressures may be obtained and used. In general the function of the reduced pressure is to eliminate air from within the apparatus which might oxidize the charge and also to provide a pressure under which sublimation occurs.

The term sublimation is employed herein in the conventional sense, and refers to a process in which volatilizable materials are caused to pass from the solid to the vapor phase without passing through the liquid phase.

In applying the process and apparatus to other materials having different melting points and other properties, suitable adjustment would be made in the process for such differences.

Also changes may be made in the apparatus. Rather than employing electrical heating, a gas fired furnace or the use of heat transfer liquids may be employed. Other modifications will be apparent to those skilled in the art.

It is to be understood that all matter contained in the above description and examples are illustrative only and do not limit the scope of this invention, as it is intended to claim the invention as broadly as possible in view of the prior art.

I claim:

1. Sublimation apparatus adapted to operate under reduced pressure comprising a support, a tubular member carried by said support and providing a chamber having a heating zone and a communicating condensing zone arranged in spaced-apart relation, a scraper having a handle portion extending through the wall of said tubular member for removing condensate from the condensing zone, a charge boat removably supported within said heating zone and adapted to contain a volatilizable chemical substance, a heating unit adapted to be moved into and out of enveloping relation with respect to said heating zone and temperature controlling means for said tubular member positioned adjacent said condensing zone.

2. A sublimation apparatus comprising a horizontally disposed chamber having an elongated heating zone and a condensing zone, a boat disposed within said heating zone and adapted to contain a chemical material to be treated, a heating unit adapted to envelope at least a part of said heating zone, a charge receiver disposed below said condensing zone and communicating therewith through a conduit, and externally operable means disposed within the condenser for scraping material condensed therein into a receiver therefor.

3. A sublimation apparatus comprising a horizontally disposed chamber having a heating zone and a condensing zone, a charge boat within said heating zone, a movable heating unit adapted to envelope at least a part of said heating zone, a charge receiver disposed below said condensing zone and communicating therewith through a conduit and chamber evacuating means communicating with said condensing zone at a point between said condenser and said receiver.

4. A sublimation apparatus adapted to operate under reduced pressure which comprises a horizontally positioned movable heating unit, a condenser member, an externally operated scraping element positioned for longitudinal movement in the condenser member to remove condensate an elongated horizontally positioned vaporizing chamber joined to the condenser member, and adapted to be housed by said heating unit, a boat adapted for containing chemical materials to be treated positioned within said vaporizing chamber, and a plurality of cooling coils disposed about the exterior of the condensing member.

References Cited in the file of this patent

UNITED STATES PATENTS

| | | |
|---|---|---|
| 1,014,258 | Ross | Jan. 9, 1912 |
| 1,379,886 | Waldo | May 31, 1921 |
| 1,580,511 | Little | Apr. 13, 1926 |
| 1,662,070 | Lyford | Mar. 13, 1928 |
| 1,674,947 | Bunce et al. | June 26, 1928 |
| 1,888,996 | McInerny | Nov. 29, 1932 |
| 1,955,272 | Carl et al. | Apr. 17, 1934 |
| 2,035,453 | Betterton | Mar. 31, 1936 |
| 2,113,230 | Ceccon | Apr. 5, 1938 |
| 2,165,742 | Blackwell et al. | July 11, 1939 |
| 2,234,871 | McDonald | Mar. 11, 1941 |
| 2,258,374 | Amati | Oct. 7, 1941 |
| 2,289,328 | Pechukas | July 7, 1942 |
| 2,304,463 | Maier | Dec. 8, 1942 |